US010495286B2

(12) United States Patent
Hikmet et al.

(10) Patent No.: US 10,495,286 B2
(45) Date of Patent: Dec. 3, 2019

(54) HIGH INTENSITY LIGHT SOURCE WITH TEMPERATURE INDEPENDENT COLOR POINT

(71) Applicant: KONINKLIJKE PHILIPS N.V., Eindhoven (NL)

(72) Inventors: Rifat Ata Mustafa Hikmet, Aachen (DE); Roman Hohn, Aachen (DE)

(73) Assignee: LUMILEDS LLC, San Jose, CA (US)

( * ) Notice: Subject to any disclaimer, the term of this patent is extended or adjusted under 35 U.S.C. 154(b) by 51 days.

(21) Appl. No.: 15/571,187

(22) PCT Filed: Apr. 28, 2016

(86) PCT No.: PCT/EP2016/059467
§ 371 (c)(1),
(2) Date: Nov. 1, 2017

(87) PCT Pub. No.: WO2016/177622
PCT Pub. Date: Nov. 10, 2016

(65) Prior Publication Data
US 2018/0306409 A1    Oct. 25, 2018

(30) Foreign Application Priority Data
May 7, 2015    (EP) ................................. 15166786

(51) Int. Cl.
*F21V 21/00* (2006.01)
*F21V 9/32* (2018.01)
(Continued)

(52) U.S. Cl.
CPC ............. *F21V 9/32* (2018.02); *C09K 11/7766* (2013.01); *C09K 11/7774* (2013.01); *F21K 9/64* (2016.08);
(Continued)

(58) Field of Classification Search
CPC ..... F21V 9/32; F21K 9/64; F21S 41/14; F21S 41/16; F21S 41/176; C09K 11/7766;
(Continued)

(56) References Cited

U.S. PATENT DOCUMENTS

| 5,094,958 A | 3/1992 | Klainer et al. |
| 6,594,513 B1 | 7/2003 | Jobsis et al. |

(Continued)

FOREIGN PATENT DOCUMENTS

| EP | 2346101 A1 | 7/2011 |
| EP | 2666403 A1 | 11/2013 |
| EP | 2814072 A1 | 12/2014 |

OTHER PUBLICATIONS

EPO as ISA, "International Search Report and Written Opinion" dated Jun. 22, 2016 from International Application No. PCT/EP2016/059467, filed Apr. 28, 2016, 11 pages.
(Continued)

*Primary Examiner* — Laura K Tso

(57) ABSTRACT

The invention provides a lighting device comprising a lighting unit, wherein the lighting unit comprises a light source configured to generate light source light and a luminescent material configured to convert at least part of the light source light into luminescent material light, wherein the lighting device is configured to generate lighting device light comprising at least part of said luminescent material light, wherein the luminescent material is configured to provide said luminescent material light upon excitation by said light source light in an excitation band (EX) of said luminescent material, wherein the light source is configured to provide said light source light with a full width half maximum (FWHM) of equal to or less than 30 nm, and wherein said light source is configured to excite the luminescent material in an isosbestic point (IP) of said excitation band (EX).

14 Claims, 4 Drawing Sheets

(51) Int. Cl.
*F21K 9/64* (2016.01)
*C09K 11/77* (2006.01)
*H05B 33/14* (2006.01)
*F21S 41/14* (2018.01)
*F21S 41/16* (2018.01)
*F21S 41/176* (2018.01)
*F21Y 115/30* (2016.01)
*F21Y 115/10* (2016.01)
*F21Y 115/15* (2016.01)

(52) U.S. Cl.
CPC ............... *F21S 41/14* (2018.01); *F21S 41/16* (2018.01); *F21S 41/176* (2018.01); *H05B 33/14* (2013.01); *F21Y 2115/10* (2016.08); *F21Y 2115/15* (2016.08); *F21Y 2115/30* (2016.08)

(58) Field of Classification Search
CPC ............. C09K 11/7774; F21Y 2115/30; F21Y 2115/10; F21Y 2115/15
USPC .......................................... 362/509, 84, 259
See application file for complete search history.

(56) References Cited

U.S. PATENT DOCUMENTS 8,105,502 B2  1/2012  Fukuda et al.
2006/0227570 A1*  10/2006  Rutherford ............ H04N 9/315
                                                                            362/612
2014/0340918 A1  11/2014  Suckling et al.

OTHER PUBLICATIONS

Extended European Search Report dated Dec. 2, 2015 from European Patent Application No. 15166786.2 filed May 7, 2015, 5 pages.
Bechtel et al., "Lumiramic: A New Phosphor Technology for High Performance Solid State Light Sources", Proceedings of SPIE, vol. 7058, Aug. 26, 2008, pp. 70580E-1-70580E-10.
Communication pursuant to Article 94(3) EPC dated Jun. 6, 2018, European Patent Application No. 16720793.5, 4 pages.

* cited by examiner

HIGH INTENSITY LIGHT SOURCE WITH TEMPERATURE INDEPENDENT COLOR POINT

CROSS-REFERENCE TO RELATED APPLICATIONS

The present application is a § 371 application of International Application No. PCT/EP2016/059467 filed on Apr. 28, 2016 and titled "HIGH INTENSITY LIGHT SOURCE WITH TEMPERATURE INDEPENDENT COLOR POINT," which claims the benefit of European Patent Application No. 15166786.2 filed on May 7, 2015. International Application No. PCT/EP2016/059467 and European Patent Application No. 15166786.2 are incorporated herein.

FIELD OF THE INVENTION

The invention relates to a lighting device comprising a lighting unit, wherein the lighting unit comprises a light source configured to generate light source light and a luminescent material configured to convert at least part of the light source light into luminescent material light. The invention also relates to a lighting apparatus comprising one or more of such lighting devices. Further, the invention relates to the use of the lighting device or the lighting apparatus for specific applications.

BACKGROUND OF THE INVENTION

The temperature dependence of the emission intensity of certain phosphors is known in the art. U.S. Pat. No. 8,105,502, for instance, mentions $CaAlSiN_3$:Eu as a red luminescent material for an LED lamp (light-emitting diode). Such luminescent material, when excited in a broad (ultraviolet to blue) wavelength range, shows luminescence in the range of an orange color region to an infrared region. Among many luminescent materials, this $CaAlSiN_3$:Eu has—according to U.S. Pat. No. 8,105,502—relatively excellent temperature characteristics. It is further indicated that it is estimated that as the power of the LED lamp is increased, the temperature of the device is further increased, and that accordingly luminescent materials are required that have more excellent temperature characteristics.

High brightness light sources are interesting for various applications including automotive lighting, such as headlamps. A method of obtaining high intensity light is based on using lasers where the high intensity laser beam is focused on a rotating phosphor wheel. It is also possible to provide a phosphor (i.e. luminescent material) on a static heat sink and illuminating it with a focused laser beam in order to obtain high intensity white light. In such an arrangement e.g. white light is obtained when blue light is partially converted to yellow light by a phosphor ceramic. The thickness and the activator concentration can be adjusted so that the ratio of converted and unconverted light is controlled. In this way the desired color point can be obtained. However, during the use of the light source, for example during dimming etc., the temperature of the phosphor can change. As the phosphor, especially a so called garnet phosphor, shows temperature dependent absorbance, the color point of the device can show a change as a result of this temperature change, which is an undesirable effect.

Hence, prior art lighting devices suffer from temperature dependency of the emission (luminescence) of the luminescent material, which especially becomes relevant when subjecting such luminescent material to high power excitations.

SUMMARY OF THE INVENTION

Hence, it is an aspect of the invention to provide an alternative lighting device, which preferably further at least partly obviates one or more of above-described drawbacks.

Solutions to reduce the temperature dependency of the emission of the luminescent material may amongst others be chosen from cooling the luminescent material, choosing specific types of luminescent material (see above), choosing other types of light sources, waiving the use of luminescent materials, etc.

We have surprisingly found that for at least garnet type of phosphors there is a point where the absorbance is substantially not temperature dependent. We therefore suggest matching the emission peak of the laser, or other, especially narrow band light source with the absorption wavelength of the phosphor where the absorbance of the phosphor shows almost no temperature dependence (over a broad temperature range) in order to obtain a substantially temperature independent emission intensity. Therefore, in specific embodiments a white lighting device is provided having a substantially temperature independent color point, such as over a range of 50-200° C.

Hence, in a first aspect the invention provides a lighting device ("device") comprising a lighting unit, wherein the lighting unit comprises (i) a light source, especially a solid state based light source, configured to generate light source light, and (ii) a luminescent material configured to convert at least part of the light source light into luminescent material light (herein also indicated as "emission" or "luminescence"), wherein the lighting device is configured to generate lighting device light ("device light") comprising at least part of said luminescent material light, wherein the luminescent material is configured to provide said luminescent material light upon excitation by said light source light in an excitation band (EX) of said luminescent material, wherein the light source is configured to provide said light source light with a full width half maximum (FWHM) of equal to or less than 30 nm, especially equal to or less than 20 nm, even more especially equal to or less than 10 nm, yet even more especially equal to or less than 5 nm, such as especially equal to or less than 2 nm, and wherein said light source is configured to excite the luminescent material in an isosbestic point (IP) of said excitation band (EX).

With such a lighting device, e.g. white light may be generated of which the color point may substantially be independent of the luminescent material temperature, over a luminescent material temperature range of 50-100° C., or over the range of 50-150° C., or over the range of 50-200° C., or even to higher temperatures. Substantially independent color temperatures for white light were found when cerium comprising garnets were excited in their isosbestic (excitation) point over a temperature range of 50-250° C. With such a lighting device, the light source and the luminescent material are, in a special embodiment, not in physical contact with each other, e.g. there may be a slit or spacing in between. Therefore, the temperature of the luminescent material may be much higher than the temperature of the light source. During the operation of conventional white LEDs, wherein the luminescent material is placed on top of the LED die and the absorption peak of the luminescent material substantially corresponds to the emission peak of the LED (i.e. the excitation radiation), there may be not much variation in temperature. Hence, the color temperature may substantially stay the same. However, at least for a device wherein there is a non-zero distance between the light source and the luminescent material, output from a (solid state) light source, such as a laser, may result therein that the temperature of the luminescent material can be found to vary over a substantial temperature range. Herein, the temperature refers to especially the temperature of the luminescent material, which may (thus) be substantially higher than the temperature of the light source. It appears that it is advantageous to configure the luminescent material remote (i.e. at non-zero distance) from the light source, so that it is not in thermal contact with the (solid state) light source. Hence, especially the light source and luminescent material are preferably not in physical contact. More especially, a light exit surface of the light source and the luminescent material are preferably not in physical contact (see further also below).

In spectroscopy, an isosbestic point is a specific wavelength, wavenumber or frequency at which the total absorbance of a sample does not change during a chemical reaction or a physical change of the sample. Here, the physical change indicates the subjection of the luminescent material to the excitation light, by which part of the luminescent species of the luminescent materials, such as trivalent cerium ions in the case of cerium doped garnet (see also below), are brought in the excited state to subsequently decay by providing the luminescence (herein also indicated as emission). Hence, the isosbestic point may herein also be indicated as isosbestic excitation point.

Each luminescent material has an emission spectrum and an excitation spectrum. An emission may have a corresponding excitation spectrum. Hence, an emission band may have a corresponding excitation band. Herein, excitation may especially take place in an excitation band closest in energy to the emission band. Especially, the emission band is Stokes-shifted relative to the emission band. Hence, in general the excitation takes places in the lowest energetic excitation band. The phrase "excitation by said light source light in an excitation band of said luminescent material" may also be read as excitation by said light source light in an excitation band corresponding to the luminescent material light of said luminescent material. The luminescent material light is the light that emanates from the luminescent material upon excitation by the light source light. The term "luminescent material light" may also be indicated as "emission" and the term "light source light" may also be indicated as excitation light.

Here, the isosbestic point especially refers to the excitation wavelength where under excitation at the same wavelength the integrated emission intensity changes between 50-100° C. with less than 5%, especially less than 2% (relative to the integrated emission intensity at 50° C.). Especially, the isosbestic point refers to the excitation wavelength where under excitation at the same wavelength the integrated emission intensity changes between 50-150° C. with less than 10%, especially less than 5%, even more especially less than 2% (relative to the integrated emission intensity at 50° C.). Yet even more especially, the isosbestic point refers to the excitation wavelength where under excitation at the same wavelength the integrated emission intensity changes between 50-200° C. with less than 10%, especially less than 5%, even more especially less than 2% (relative to the integrated emission intensity at 50° C.). Hence, the luminescent material temperature may vary in the range of e.g. 50-100° C., e.g. dependent upon the power of the light source, but nevertheless the color point of the lighting device light may substantially be independent thereof.

Further, excitation of the luminescent material described herein is especially not based on a line excitation (absorption), such as an excitation having a spectral width of less than 5 nm at room temperature ("RT"; defined as 20° C.). Especially, the excitation of the luminescent material is a band excitation, having an FWHM of at least 20 nm, such as at least 40 nm at RT (see e.g. also FIG. 2a). Hence, in contrast to prior art systems, the light source is not configured to excite at the spectral maximum of such excitation band, but at one of the wings. The position of the isosbestic point may depend upon the luminescent material, but is generally found at about 30-45% of the peak height of the excitation maximum (at RT). The luminescent material, more precisely its excitation band, may have two isosbestic (excitation) points, one at the high energy flank of the excitation band and one at the low energy flank of the excitation band. Their heights at room temperature are not necessarily the same.

The luminescent material may be chosen such that at least one isosbestic point is in the visible part of the spectrum. This may advantageously allow excitation in the visible wavelength range, whereby part of the excitation light, i.e. especially part of the light source light, is converted into luminescent material light but part of the light source light may also be used as part of the lighting device light. Hence, the lighting device is configured to generate lighting device light comprising at least part of said luminescent material light and optionally also part of the light source light. Therefore, in an embodiment, the luminescent material comprises an isosbestic point (IP) in the blue wavelength range of the visible spectrum. Alternatively or additionally, the luminescent material comprises an isosbestic point (IP) in the green wavelength range of the visible spectrum. Alternatively or additionally, the luminescent material comprises an isosbestic point (IP) in the red wavelength range of the visible spectrum, especially when the luminescent material has a relatively small Stokes shift, such as equal to or smaller than 100 nm, especially equal to or smaller than 50 nm. Alternatively or additionally, the luminescent material comprises an isosbestic point in another part of the visible part of the spectrum.

Assuming that the luminescent material comprises an isosbestic (excitation) point in the blue, especially a blue light emitting light source may be applied, like a blue LED or a blue laser. Hence, in an embodiment the light source is configured to generate blue light source light.

Especially, the light source is a light source that during operation emits (light source light) at least light at a wavelength selected from the range of 200-490 nm, especially a light source that during operation emits at least light at a wavelength selected from the range of 400-490 nm, even more especially in the range of 440-490 nm. This light may partially be used by the wavelength converter, i.e. the luminescent material. Hence, in a specific embodiment, the light source is configured to generate blue light (source light). In a specific embodiment, the light source comprises a solid state LED light source (such as a LED or laser diode). The term "light source" may also relate to a plurality of light sources, such as 2-20 (solid state) LED light sources. Hence, the term LED may also refer to a plurality of LEDs.

Hence, the light source is radiationally coupled to the luminescent material. The term "radiationally coupled" especially means that the light source and the luminescent material are associated with each other so that at least part of the radiation emitted by the light source is received by the luminescent material (and at least partly converted into luminescence). The luminescent material may be configured at a non-zero distance from the light source, or may be in physical contact with the light source. The former embodiment can be further differentiated as vicinity or remote, with the former having the luminescent material closer and the latter having it further away from the light source. Herein, in an embodiment the light source comprises a light emitting surface configured at a distance of equal to or less than 1 mm from the luminescent material. Hence, in a special embodiment, the distance is relatively small, or even zero. Hence, in yet a further embodiment, the light source comprises a light emitting surface in physical contact with the luminescent material. However, the distance may also be non-zero, such as at least 0.1 mm, like at least 0.2 mm, or at least 0.5 mm, like at least 1 mm, especially at least 2 mm, or at least 5 mm, like in the range of 0.1-20 mm, such as especially 0.5-20 mm. Here, the distance especially refers to the shortest distance between a light exit surface (such as a solid state light source die) and the luminescent material (see further also below).

Hence, more generally the lighting device comprises a light converter or wavelength converter. The converter may be a luminescent material per se. In yet another embodiment, the converter comprises a matrix wherein the luminescent material is embedded (such as dispersed).

Hence, in a specific embodiment the lighting device comprises a converter comprising said luminescent material, wherein the converter comprises a converter surface, wherein the light source comprises a light exit surface, and wherein the converter surface is configured at a shortest distance (d) of at least 0.5 mm, or at least 1 mm, or at least 2 mm, such as in the range of 0.5-20 mm. Hence, especially the light source and the luminescent material are not in physical contact, especially not in thermal contact. Especially, between the light source and the luminescent material there is one or more of a gas (like air), or vacuum, or a thermally low conductive material, especially gas or vacuum.

The luminescent material may especially be an inorganic luminescent material, such as a quantum dot based luminescent material or an inorganic phosphor. Though the term "luminescent material" may refer in embodiments to a combination of two or more different luminescent materials, herein the terms "luminescent material" or "luminescent material radiationally coupled to the light source" especially refer to substantially a single luminescent material. In an embodiment, the luminescent material comprises at least 90 weight percent ("wt. %"), especially at least 95 wt. %, of a single luminescent species (such as quantum dots, organic dyes or inorganic phosphors). For instance, the luminescent material (whether embedded or not) may comprise at least 90 wt. % of CdS/ZnS core/shell quantum dots, such as dots (core) in rods (shell).

Especially, the luminescent material comprises a luminescent material of the type $A_3B_5O_{12}:Ce^{3+}$, wherein A is selected from the group consisting of Y, Gd, Tb and Lu, and wherein B is selected from the group consisting of Al, Ga and Sc. The luminescent material may (thus) comprise a garnet material. Hence, in an embodiment the luminescent material comprises a cerium doped garnet material of the class of $A_3B_5O_{12}:Ce^{3+}$. Especially, the luminescent material may comprise a luminescent ceramic. The garnet material, especially the ceramic garnet material, is herein also indicated as "luminescent material". The luminescent material comprises a $A_3B_5O_{12}:Ce^{3+}$ (garnet material), wherein A is especially selected from the group consisting of Sc, Y, Tb, Gd, and Lu, wherein B is especially selected from the group consisting of Al, Sc and Ga. More especially, A comprises one or more of yttrium (Y), gadolinium (Gd) and lutetium (Lu), and B comprises aluminum (Al). Such garnet may be doped with cerium (Ce), and optionally with other luminescent species such as praseodymium (Pr). In a specific embodiment, B consists of about 40% or more of Al and 60% or less of Ga. Especially, B comprises aluminum (Al), however, B may also partly comprise gallium (Ga) and/or scandium (Sc) and/or indium (In), especially up to about 20% of Al, more especially up to about 10% of Al may be replaced (i.e. the A ions essentially consist of 90 or more mole % of Al and 10 or less mole % of one or more of Ga, Sc and In); B may especially comprise up to about 10% gallium. In another variant, B and O may at least partly be replaced by Si and N. Phrases like "A is selected from the group consisting of Y, Gd, Tb and Lu" and similar phrase indicate that A may comprise one or more of Y, Gd, Tb and Lu.

As indicated above, the element A may especially be selected from the group consisting of yttrium (Y), gadolinium (Gd), terbium (Tb) and lutetium (Lu).

Especially, A comprises at least one or more of Y, Gd and Lu, even more especially at least one or more of Y and Lu. Further, especially at least 90 mol. % of B is Al. In an embodiment, the luminescent material comprises $(Y,Lu)_3Al_5O_{12}:Ce$, wherein "Y,Lu" indicates that A may comprise one or more of Y and Lu.

The luminescent materials described herein are especially indicated with their chemical formulas. Even though the elements are indicated, the presence of impurities and/or other phases is not excluded. The luminescent material ("phosphor") may also include impurities, like one or more of halogen impurities and metal impurities. The luminescent material, may next to the one or more luminescent materials as defined herein, also include other phases, like one or more of the—already indicated (remaining)—flux material, remaining starting material(s) and one or more phases that are also formed during synthesis of the one or more (respective) luminescent materials. In general, the weight percentage of such other phase(s) will be below about 10 wt. % (relative to the total weight of the luminescent material). This is known in the art.

Hence, the peak maximum of the excitation light, i.e. the light source light, and the isosbestic point(s) of the luminescent material are especially selected such that they essentially overlap. In a specific embodiment, the light source is configured to provide said light source light having a peak maximum (MX2), wherein said peak maximum (MX2) is selected within 5 nm of said isosbestic point (IP). Further, especially the light source provides light source light having an emission band (i.e. the excitation light for the luminescent material) having a FWHM of equal to or less than 20 nm, but especially the band width is substantially smaller, such as equal to or less than 10 nm, like 5 nm or less (such as in the case of a laser). Here, the bandwidth of the light source light is indicated in relation to operation at maximum power.

Further, as indicated above, the merits of the invention may even be more relevant when the light source is a high power light source and/or its light is relatively focused. Hence, in a further embodiment the lighting device comprises a converter comprising said luminescent material, wherein the converter comprises a converter surface and wherein the light source is configured to provide said light source light to said converter surface with a power which leads to irradiance on the illuminated surface of the converter of at least 1 W/cm$^2$. Hence, in a specific embodiment, the lighting device comprises a converter comprising said luminescent material, wherein the converter comprises a converter surface wherein the light source is configured to provide said light source light to said converter surface. Especially, the light source is configured to provide said light source light to said converter surface with a power which leads to irradiance on the illuminated surface of the converter of at least 1 W/cm$^2$, such as at least 5 W/cm$^2$, even more especially at least 10 W/cm$^2$, yet more especially at least 25 W/cm$^2$. The irradiance or illumination can be even higher when a small area of luminescent material is illuminated by a laser; in that case the irradiance can be at least 100 W/cm$^2$, such as 1000 W/cm$^2$ or even higher.

In a specific embodiment the lighting device is configured to provide said lighting device light with a radiance of at least 2 W/(sr·mm$^2$). The unit "sr" refers to steradian (solid angle). Also even higher radiance may be achieved, such as at least 5 W/(sr·mm$^2$) to the luminescent material, such as in the range of 5-50 W/(sr·mm$^2$).

As indicated above, this converter surface may be the surface of a luminescent material layer, such as a coating. Therefore, in a specific embodiment the light source is configured to provide said light source light having a peak maximum (MX2), wherein said peak maximum (MX2) is selected within 5 nm of said isosbestic point (IP), wherein the light source light has a full width half maximum (FWHM) of equal to or less than 10 nm, wherein the lighting device comprises a converter comprising said luminescent material, wherein the converter comprises a converter surface and wherein the light source is configured to provide said light source light to said converter surface with a power which leads to irradiance on the illuminated surface of the converter of at least 1 W/cm$^2$. As indicated above, especially the light source is a relatively narrow band light source. Therefore, in a further embodiment the light source comprises a laser, such as a solid state laser.

The luminescent material may e.g. be provided as luminescent layer.

Further, the lighting device may include a heat sink configured to facilitate cooling of the solid state light source. The heat sink may comprise or consist of copper, aluminum, silver, gold, silicon carbide, aluminum nitride, boron nitride, aluminum silicon carbide, beryllium oxide, silicon-silicon carbide, aluminum silicon carbide, copper tungsten alloys, copper molybdenum carbides, carbon, diamond, graphite, and combinations of two or more thereof.

As indicated above, the invention may be applied for illuminating a small area phosphor. Therefore, in a further embodiment the lighting device comprises a spot of luminescent material, wherein the spot has an area of at maximum 4 mm$^2$, such as at maximum 1 mm$^2$. Examples of such small area or small spot phosphors are e.g. at maximum 0.25 mm$^2$, such as especially at maximum 0.04 mm$^2$, like even more especially at maximum 0.01 mm$^2$. A minimum area may be in the range of e.g. about 0.001 mm$^2$. Small area phosphors may e.g. be used for coupling light into a light fiber, e.g. for automotive applications. The area that is illuminated with the light source light may thus also be indicated as converter surface. Hence, in an embodiment, the lighting device comprises a spot of luminescent material, wherein the spot has an area of at maximum 1 mm$^2$.

The luminescent material, or especially the small area phosphor, is configured to convert at least part of the light source light.

As indicated above, the lighting device light consists of (i) at least part of said luminescent material light, or (ii) at least part of said luminescent material light and part of said light source light.

However, the lighting device may further include another light source, optionally radiationally coupled with a further luminescent material. Such combination of light source and luminescent material may optionally also be configured as the above described combination. Hence, in an embodiment the lighting device comprises a single lighting unit comprising (i) the light source, especially a solid state based light source, configured to generate light source light and (ii) the luminescent material configured to convert at least part of the light source light into luminescent material light as defined above with respect to an excitation wavelength and an isosbestic point, optionally further comprising a further light source, optionally radiationally coupled to a further luminescent material. The lighting device light may then comprise at least one or more of the luminescent material light and the further luminescent material light, and optionally one or more of the light source light and the further light source light. For instance, in this way a white lighting device may be generated.

However, the lighting device may also comprise a plurality of lighting units, of which one or more may be the same, but of which also one or more may be different. Hence, in yet a further embodiment the lighting device further comprises a plurality of said lighting units, wherein each lighting unit is configured to provide a corresponding luminescent material light, wherein the lighting device light comprises one or more of said luminescent material light. For instance, also in this way e.g. a white lighting device light may be generated.

Hence, in a specific embodiment, the lighting device is configured to provide white lighting device light. Note that the lighting device may also be configured to provide colored lighting device light. Further, when the lighting device comprise more than one (different) light sources and/or more than one (different) luminescent materials, configurations of light source(s) and luminescent material(s) may be chosen that provide colored light.

Further, the lighting device may also comprise a control unit configured to control the intensity of the light source light. Thereby, the intensity of the lighting device light may be controlled, and optionally also the color of the lighting device light. Especially, the color point of the lighting device light is thus substantially independent of the temperature of the luminescent material. Hence, in a specific embodiment the lighting device may have a color point change (of the lighting device light) in the range of $|\Delta x| \le 0.05$ and/or $|\Delta y| \le 0.05$, especially $|\Delta x| \le 0.03$ and/or $|\Delta y| \le 0.03$, for a luminescent material temperature over the range of 50-100° C., or over the range of 50-150° C., or even over the range of 50-200° C. (relative to the color point of the luminescent material at 50° C.). Hence, the color point of the lighting device light may substantially be independent of the temperature of the luminescent material. Hence, by exciting with the light source in the isosbestic (excitation) point, a substantially luminescent temperature independent color point of the lighting device light may be obtained. Of course, when the lighting device includes e.g. one or more other light source, optionally also the color point may be varied.

The invention also provides in a further aspect a lighting apparatus ("apparatus") comprising the lighting device as defined herein. Hence, in a further embodiment of the lighting apparatus, this apparatus further comprises one or more further lighting devices, wherein the lighting device and the one or more further lighting devices are configured to provide white lighting apparatus light. Especially, the one or more further lighting devices comprise one more lighting devices as defined herein. For instance, lighting devices generating blue, green and red light may be combined. Alternatively or additionally, a lighting device as defined herein generating blue light may be used to illuminate a yellow phosphor.

The lighting device may be part of or may be applied in e.g. fiber-optics application systems, warning sign systems, indicator sign systems, portable systems or automotive applications. Especially, the lighting device as defined herein or the lighting apparatus as defined herein may be used in automotive lighting. Hence, one of the applications may be in automotive, such as in headlights of cars, trucks, busses, motors, trains, metros, etc. etc. Hence, in an embodiment, the invention also provides an automotive lamp comprising the lighting device as defined herein.

The terms "violet light" or "violet emission" especially relate to light having a wavelength in the range of about 380-440 nm. The terms "blue light" or "blue emission" especially relate to light having a wavelength in the range of about 440-495 nm (including some violet and cyan hues). The terms "green light" or "green emission" especially relate to light having a wavelength in the range of about 495-570 nm. The terms "yellow light" or "yellow emission" especially relate to light having a wavelength in the range of about 570-590 nm. The terms "orange light" or "orange emission" especially relate to light having a wavelength in the range of about 590-620 nm. The terms "red light" or "red emission" especially relate to light having a wavelength in the range of about 620-780 nm. The term "pink light" or "pink emission" refer to light having a blue and a red component. The terms "visible", "visible light" or "visible emission" refer to light having a wavelength in the range of about 380-780 nm.

BRIEF DESCRIPTION OF THE DRAWINGS

Embodiments of the invention will now be described, by way of example only, with reference to the accompanying schematic drawings in which corresponding reference symbols indicate corresponding parts, and in which.

The schematic drawings are not necessarily on scale.

DETAILED DESCRIPTION OF THE EMBODIMENTS

Figure 1A:
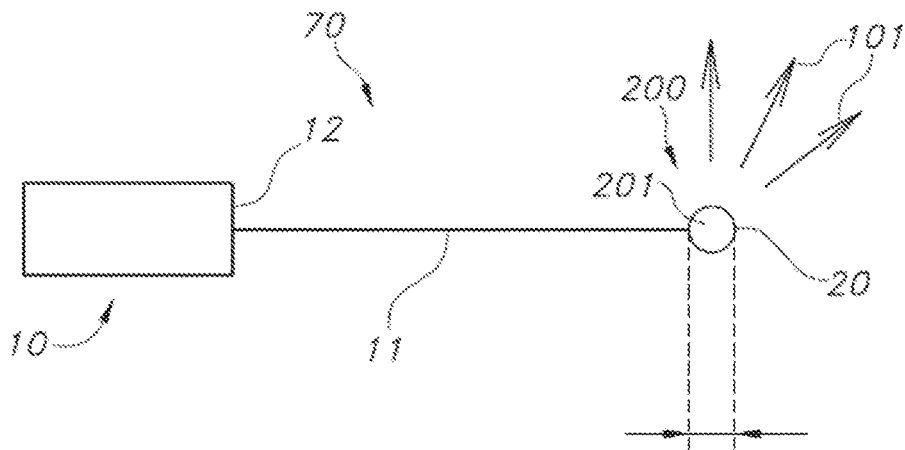
FIGS. 1a-1e schematically depict some aspects of the invention.

FIG. 1a schematically depicts an embodiment of a lighting device 100 configured to generate lighting device light 101. The lighting device 100 comprises a light source 10, configured to generate light source light 11 at a light exit surface 12, and a luminescent material 20, configured to convert at least part of the light source light 11 into luminescent material light 21. The light downstream of the lighting device 100 is indicated with reference 101. The light 101 at least comprises the emission or luminescence of the luminescent material 20, i.e., the luminescent material light 21. Optionally, some of the light source light 11 might also be comprised by the lighting device light 101. This may not be a problem, as the wavelength of the light source light and the luminescent material light may be substantially identical and/or may have a desired color (such as blue light source light with yellow luminescent material light).

The light source 10 is configured upstream of the luminescent material 20; the luminescent material light 21 emanates downstream from said luminescent material. Especially, herein a transmissive configuration is applied. The terms "upstream" and "downstream" relate to an arrangement of items or features relative to the propagation of the light from a light generating means (here especially the light source 10), wherein relative to a first position within a beam of light from the light generating means, a second position in the beam of light closer to the light generating means is "upstream", and a third position within the beam of light further away from the light generating means is "downstream". Here, by way of example a transmissive configuration is depicted. However, as indicated below, also reflective configurations may be chosen.

FIG. 1a schematically depicts an embodiment of the lighting device 100 comprising a spot of luminescent material 20, wherein the spot has an area of e.g. at maximum 1 mm$^2$, or even smaller. The dimensions of the spot are by way of example indicated with L/W/D, indicating the length and width, or the diameter, whatever may be applicable. The spot may have any (cross-sectional) shape, such as round, square, rectangular, oval, etc., but especially round (with dimension D), or square (with dimension L=W). Reference 200 indicates a converter comprising luminescent material 20, or the spot comprising the luminescent material 20, and reference 201 indicates a converter surface, i.e. a surface of the converter 200 at which the light source 10 may irradiate its light 11.

Figure 1B:
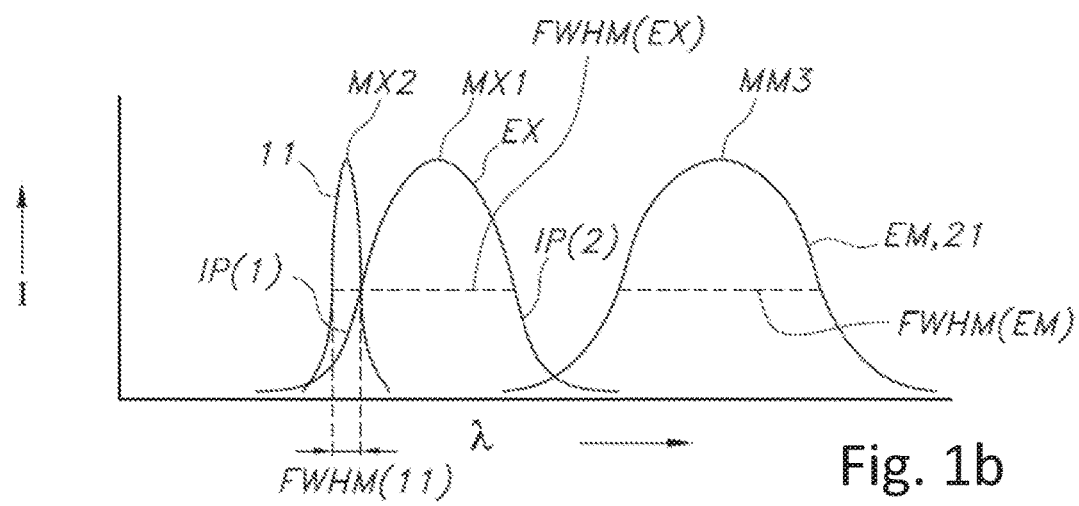

FIG. 1b schematically depicts the emission EM or luminescent material light 21 of a luminescent material. The corresponding excitation, such as when monitoring the emission of the luminescent material at an emission maximum MM3 (peak wavelength) of the emission EM or luminescent material light 21. This generates a corresponding excitation curve EX, having a maximum MX1 (peak wavelength). This excitation appears to have two isosbestic points IP, one at smaller wavelengths at the high energy flank, indicated with IP(1) and one at longer wavelengths at the low energy flank of the excitation, indicated with IP(2). The Stokes shift is the (energy) difference between the excitation maximum MX1 and the emission maximum MM3. Note that IP(1) and IP(2) are not necessarily at the same height. The luminescent material is thus excited with the light source light 11 at an isosbestic point, here by way of example IP(1), leading to the luminescent material light 21 or emission EM.

Hence, the light source is especially configured to excite the luminescent material in the excitation band at an isosbestic point IP. This is reflected in FIG. 1b in that the excitation light or light source light 11 is indicated as (narrow) band substantially only overlapping with the excitation band EX at an isosbestic point, here the high energy isosbestic point IP(1). MX2, the maximum of the light source light 11, is at about the same wavelength as IP(1).

For instance, one of these isosbestic points, here especially IP(1), may be in the blue range. Would the emission EM be in the yellow range then white lighting device light may be provided when desired.

For various applications such as automotive headlamps it is desirable to have high intensity light sources.

Such light sources can be based on laser light. However, in the case of using lasers coherence and eye safety are an issue. For that reason it is desirable to convert the laser light to other wavelengths. During the conversion large amount of heat is produced in a small volume which leads to a temperature rise.

In an embodiment, we suggest a lighting device comprising a laser diode and a phosphor material (see also for instance FIG. 1a). The phosphor material absorbs laser light and emits converted laser light.

Figure 1C:
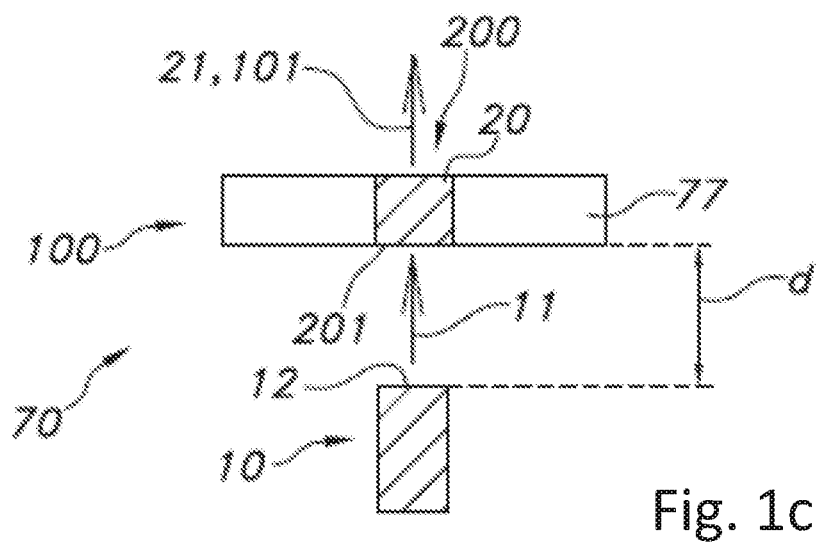
Figure 1D:
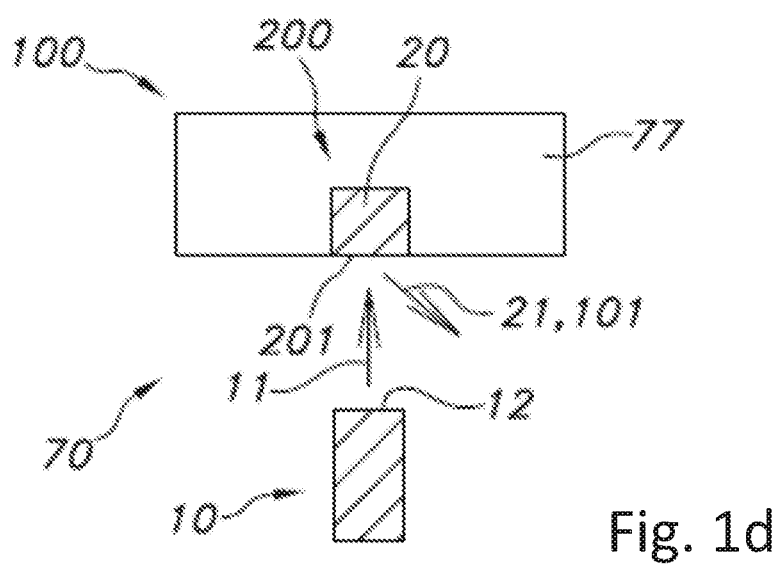

The narrow band emitter may be partly enclosed by a reflective heat sink 77 (FIG. 1c). In another configuration, we suggest the use of the converter 200 in the reflective mode (FIG. 1d). In another embodiment, we suggest the use of multiple lasers (as solid state light sources 10) pumping the same converter 200 (or luminescent element).

The light sources may in principle be any type of point light source, but is in an embodiment a solid state light source such as a Light Emitting Diode (LED), a Laser Diode, a plurality of LEDs or Laser Diodes or OLEDs or an array of LEDs or Laser Diodes, or a combination of any of these.

Further, the lighting device may include further optical elements, either separate from a waveguide and/or integrated in a waveguide, like e.g. a light concentrating element, such as a compound parabolic light concentrating element (CPC).

Figure 1E:
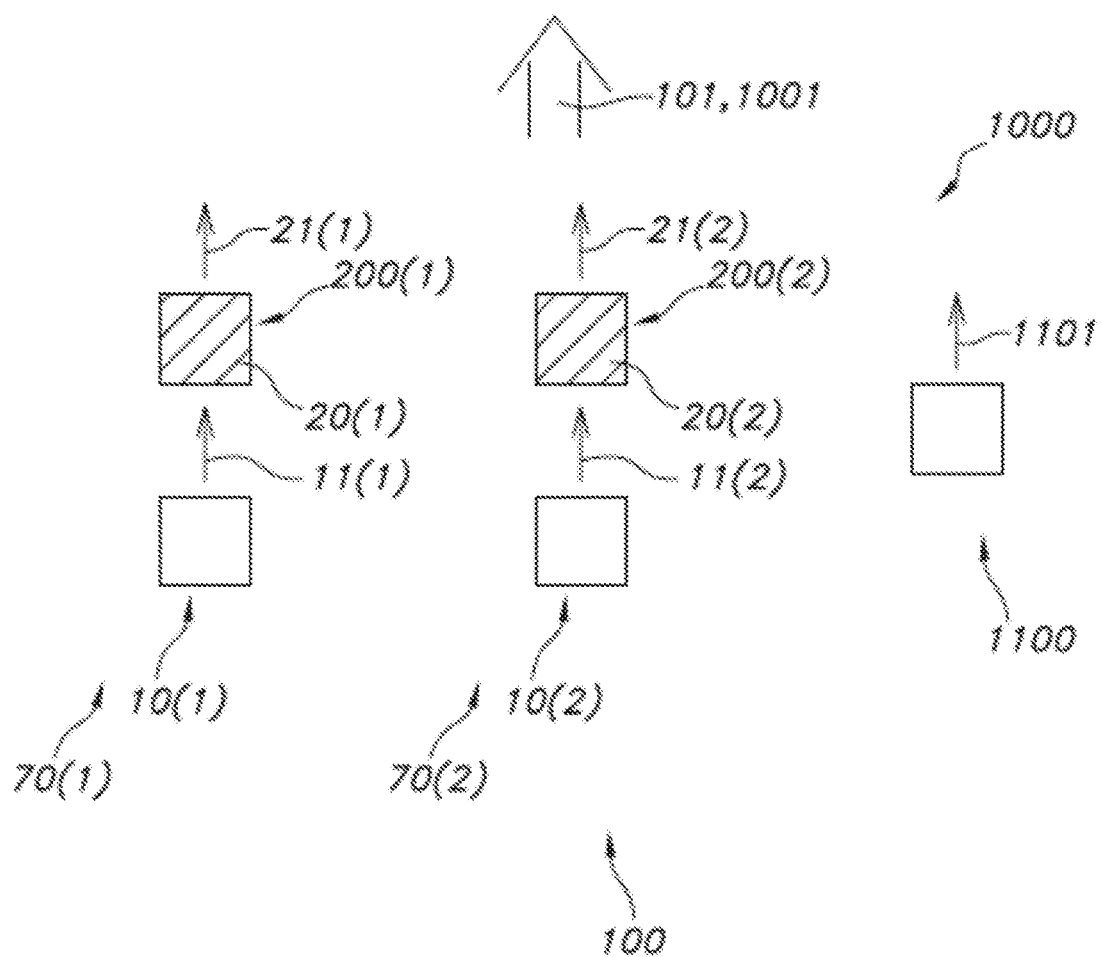

FIG. 1e schematically depicts several further aspects of the lighting device and/or a lighting apparatus. Amongst others, this schematic drawing shows an embodiment of the lighting device 100 comprising a plurality of said lighting units 70(1), 70(2), . . . , wherein each lighting unit 70(1), 70(2), . . . is configured to provide a corresponding luminescent material light 21(1), 21(2), . . . . The lighting device light 101 comprises one or more of said luminescent material light 21(1), 21(2), . . . . Note that the light sources may be identical or may be different. Likewise, the luminescent materials may be the same or different. The indications " . . . " indicate that optionally more of such items may be available (such as 70(1), 70(2), 70(3), etc. etc.). Further, as indicated above, each lighting unit may comprise a light source 10 and a luminescent material 20, radiationally coupled to said light source 10.

Further, this drawing also schematically depicts an embodiment of a lighting apparatus 1000 comprising the lighting device 100 as defined herein; here by way of example a lighting device 100 comprising at least two lighting units 70. Further, by way of example the lighting apparatus 1000 comprises one or more further lighting devices 1100. These one or more further lighting devices 1100 are configured to generate further lighting device light 1101. The lighting device 100 and the one or more further lighting devices 1100 are in an embodiment configured to provide a white lighting apparatus light 1001.

A lamp, a luminaire, and a lighting system comprising a light emitting device as defined herein may be used in one or more of the following applications: automotive lighting, fiber optic lighting, warning lighting systems. In yet another embodiment, we suggest the use of the lighting device in a lamp, a luminaire or lighting system. In yet another embodiment, we suggest the use of the lighting device in an automotive lamp, such as a headlamp.

Materials such as quantum dots (QDs) or cerium comprising garnets can be used.

Figure 2A:
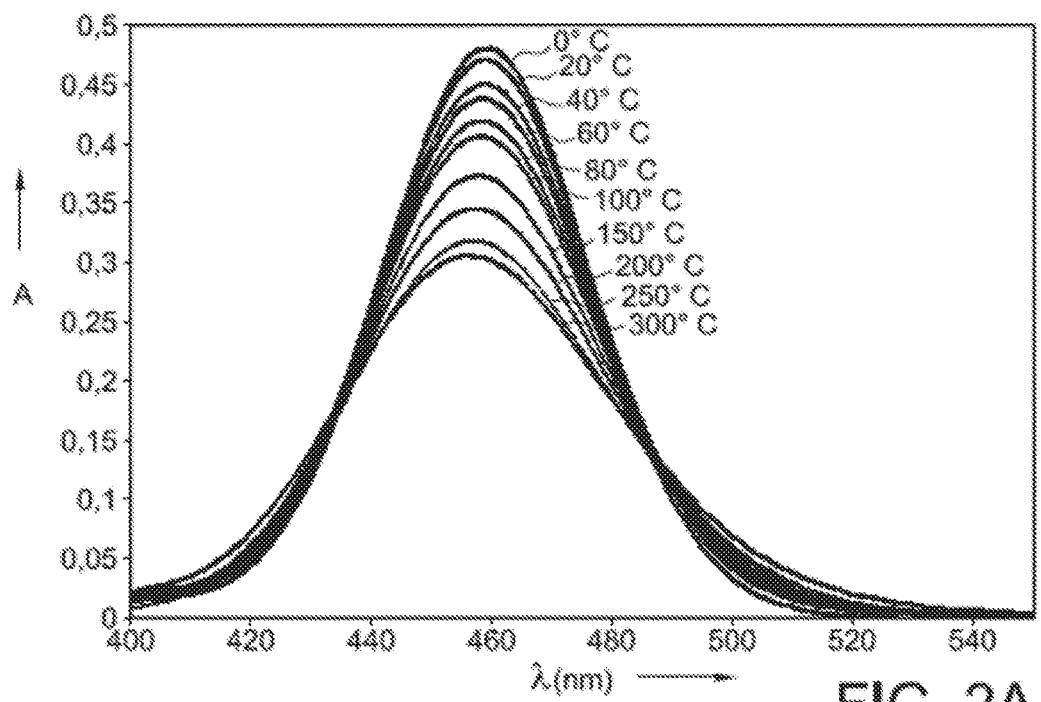
FIGS. 2a-2b show absorption (excitation) characteristics at different temperatures (2a) and different wavelengths (2b) of YAG.
Figure 2B:
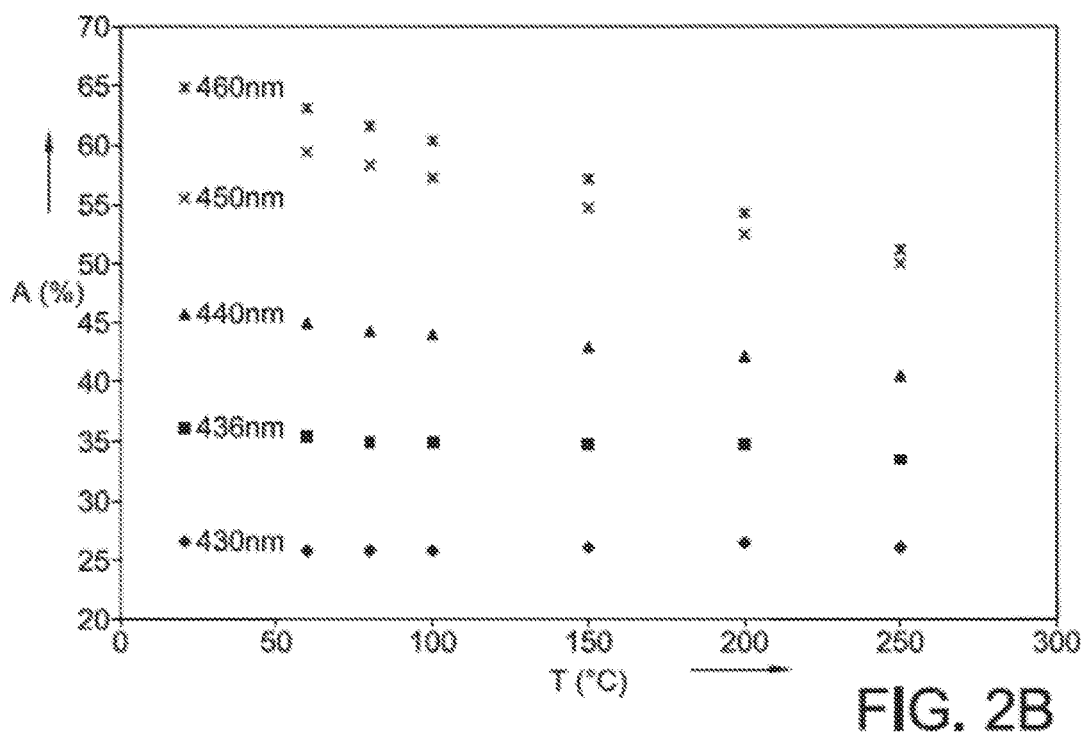

One of the most common phosphors used in the production of white LEDs is Ce:YAG (i.e. $Y_3Al_5O_{12}:Ce^{3+}$). Such a phosphor can be used in the transmission or reflective modes shown in FIGS. 1c and 1d, respectively. In this example it is assumed that 75% of the blue light is converted by Ce:YAG and there are no losses other than the so called Stokes shift losses. However, the transmittance as a function of temperature through such a phosphor ceramic with a Ce activator is temperature dependent as shown in FIG. 2a. This figure shows that the transmission shows an increase with an increasing temperature. When such a plate is illuminated by, for example, a laser source one can produce white light by partial absorption and conversion of blue to yellow light. However, as the temperature changes the ratio of blue to yellow would change altering the color point of the total light. It can be seen that as a function of temperature at 430 nm there is almost no absorption dependence as opposed to other wavelengths (FIG. 2b).

The color points of the lighting device light were measured for various excitation wavelengths at two temperatures (60 and 250° C.). A shift in the color coordinates of the lighting device light was observed (in the order of at least |Δx|=0.05 and/or |Δy|=0.05), except for the one using 430 nm as peak wavelength of the light source light. We therefore suggest matching the emission peak of the light source, such as a laser, with the absorption wavelength of the phosphor where the absorbance of the phosphor shows almost no temperature dependence (according to FIG. 2a in this phosphor case it is around 430 and around 490 nm) in order to obtain a temperature independent color point white light source.

Also other types of garnets were measured, such as LuAG 2% Ce (IP: 421 nm and 478 nm), (Y,Gd)AG 0.2% Ce 10% Gd (IP: 425 nm and 498 nm), YAG 2% Ce (IP: 430 nm and 493 nm), YAG 0.4% Ce (IP: 429 nm and 490 nm). In general, all these garnets appear to provide a stable color point with substantially no variation in the color point up to a temperature in the range of 200-300° C. Here, "IP" indicates isosbestic point and the wavelengths indicate the wavelengths at which the two respective isosbestic points were found in the experiments.

The term "substantially" herein, such as in "substantially all light" or in "substantially consists", will be understood by the person skilled in the art. The term "substantially" may also include embodiments with "entirely", "completely", "all", etc. Hence, in embodiments the adjective substantially may also be removed. Where applicable, the term "substantially" may also relate to 90% or higher, such as 95% or higher, especially 99% or higher, even more especially 99.5% or higher, including 100%. The term "comprise" includes also embodiments wherein the term "comprises" means "consists of". The term "and/or" especially relates to one or more of the items mentioned before and after "and/or". For instance, a phrase "item 1 and/or item 2" and similar phrases may relate to one or more of item 1 and item 2. The term "comprising" may an embodiment refer to "consisting of" but may in another embodiment also refer to "containing at least the defined species and optionally one or more other species".

Furthermore, the terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

The devices herein are amongst others described during operation. As will be clear to the person skilled in the art, the invention is not limited to methods of operation or devices in operation.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "to comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claims enumerating several means, several of these means may be embodied by one and the same item of hardware. The mere fact that certain measures are recited in mutually different dependent claims does not indicate that a combination of these measures cannot be used to advantage.

The invention further applies to a device comprising one or more of the characterizing features described in the description and/or shown in the attached drawings. The invention further pertains to a method or process comprising one or more of the characterizing features described in the description and/or shown in the attached drawings.

The various aspects discussed in this patent can be combined in order to provide additional advantages. Furthermore, some of the features can form the basis for one or more divisional applications.

The invention claimed is:

1. A lighting device comprising a lighting unit, wherein the lighting unit comprises a light source configured to generate light source light and a luminescent material configured to convert at least part of the light source light into luminescent material light, wherein the lighting device is configured to generate lighting device light comprising at least part of said luminescent material light, wherein the luminescent material is configured to provide said luminescent material light upon excitation by said light source light in an excitation band (EX) of said luminescent material, wherein the light source is configured to provide said light source light with a full width half maximum (FWHM) of equal to or less than 30 nm, and wherein said light source is configured to excite the luminescent material in an isosbestic point (IP) of said excitation band (EX).

2. The lighting device according to claim 1, wherein the luminescent material comprises an isosbestic point (IP) in the blue wavelength range of the visible spectrum.

3. The lighting device according to claim 1, wherein the light source is configured to generate blue light source light.

4. The lighting device according to claim 1, wherein the lighting device comprises a converter comprising said luminescent material, wherein the converter comprises a converter surface, wherein the light source comprises a light exit surface, and wherein the converter surface is configured not to be in physical contact with said light exit surface.

5. The lighting device according to claim 1, wherein the light source is configured to provide said light source light with a peak maximum (MX2), wherein said peak maximum (MX2) is selected within 5 nm of said isosbestic point (IP), wherein the light source light has a full width half maximum (FWHM) of equal to or less than 5 nm, wherein the lighting device comprises a converter comprising said luminescent material, wherein the converter comprises a converter surface, and wherein the light source is configured to provide said light source light to said converter surface with a power which leads to an irradiance on the converter surface of the converter of at least 1 W/cm$^2$.

6. The lighting device according to claim 1, wherein the light source comprises a laser.

7. The lighting device according to claim 1, comprising a spot of luminescent material, wherein the spot has an area of at maximum 1 mm$^2$.

8. The lighting device according to claim 1, wherein the luminescent material comprises a cerium doped garnet material of class of $A_3B_5O_{12}:Ce^{3+}$, wherein A is selected from the group consisting of Y, Gd, Tb and Lu, and wherein B is selected from the group consisting of Al, Ga and Sc.

9. The lighting device according to claim 1, wherein the lighting device light consists of at least part of said luminescent material light, or at least part of said luminescent material light and part of said light source light.

10. The lighting device according to claim 1, wherein the lighting device further comprises a plurality of said lighting units, wherein each lighting unit is configured to provide a corresponding luminescent material light, wherein the lighting device light comprises one or more of said luminescent material lights.

11. The lighting device according to claim 1, wherein the lighting device is configured to provide white lighting device light having a color point change in the range of $|\Delta x| \leq 0.03$ or $|\Delta y| \leq 0.03$ for a luminescent material temperature over the range of 50-200° C.

12. A lighting apparatus comprising the lighting device according to claim 1.

13. The lighting apparatus according to claim 12, further comprising one or more further lighting devices, wherein the lighting device and the one or more further lighting devices are configured to provide white lighting apparatus light.

14. The lighting apparatus according to claim 12, wherein the lighting apparatus comprises an automotive lamp.

* * * * *